Dec. 22, 1936.  R. A. MILLS  2,065,239
BEAN SLICING MACHINE
Filed April 23, 1936  2 Sheets-Sheet 2
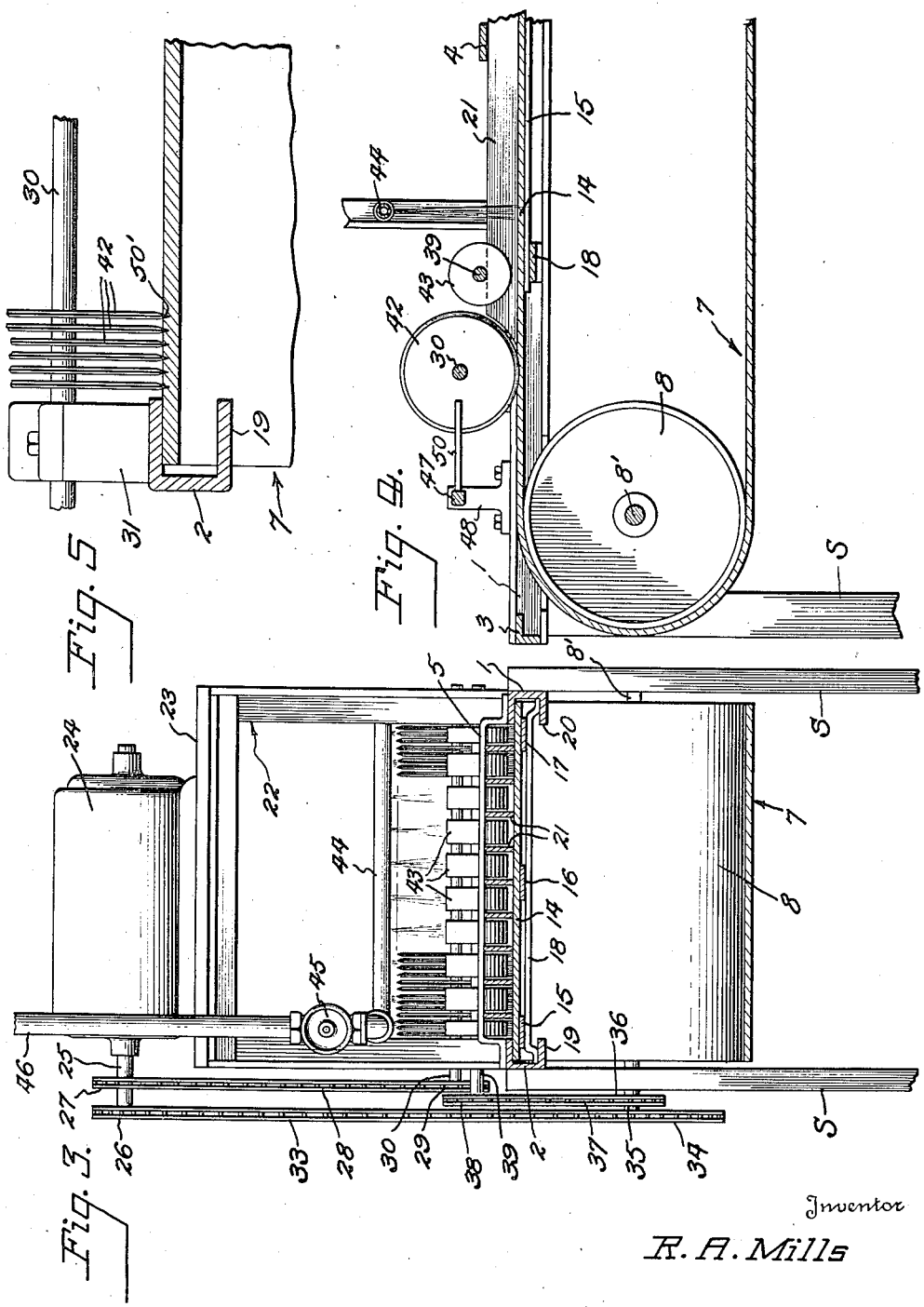

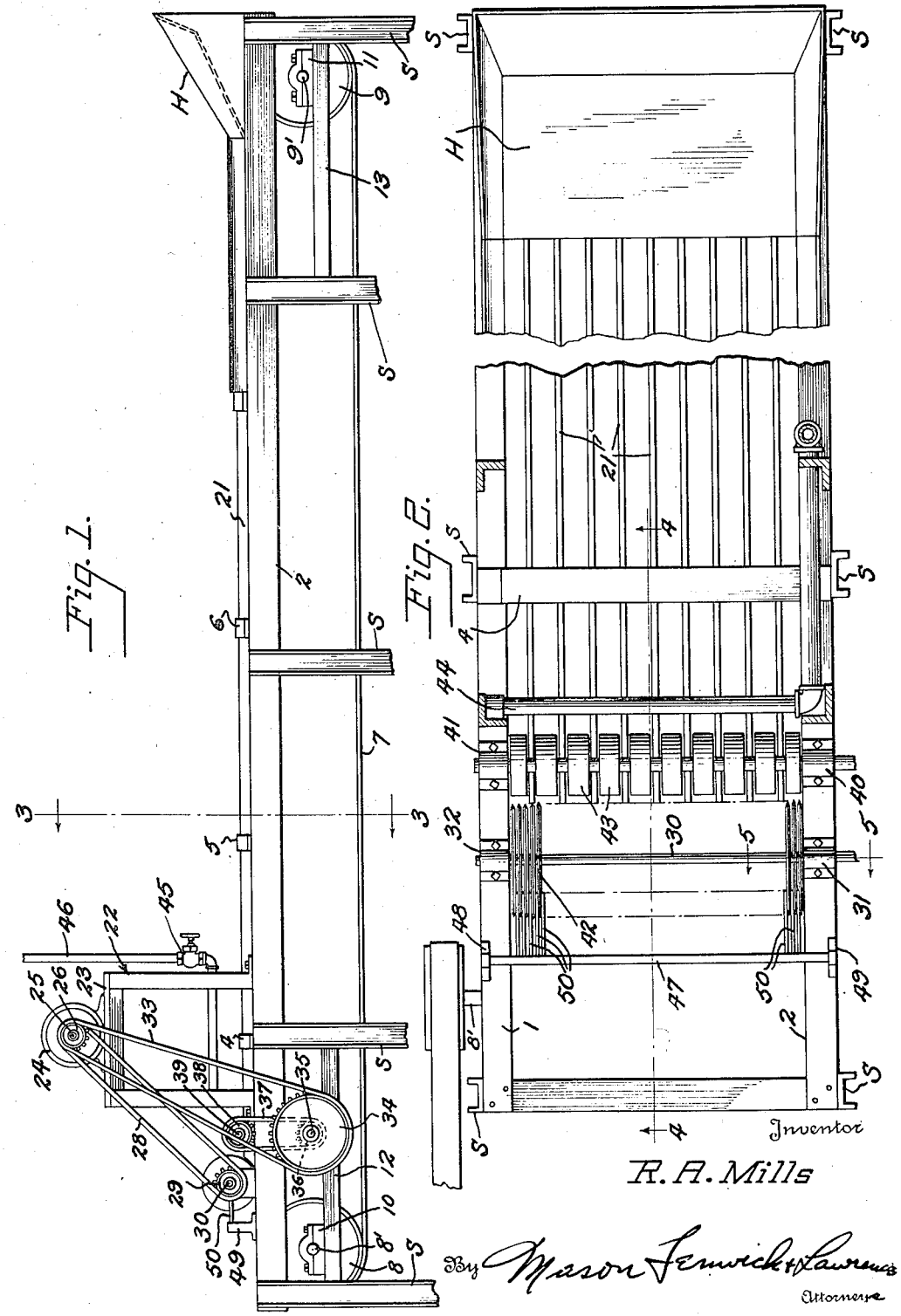

UNITED STATES PATENT OFFICE 2,065,239

BEAN SLICING MACHINE

Rufus A. Mills, Baltimore, Md., assignor to R. E. Roberts, trading as Lord-Mott Company, Baltimore, Md.

Application April 23, 1936, Serial No. 76,071

1 Claim. (Cl. 146—98)

The invention forming the subject matter of this application is a machine particularly designed for slicing stringless beans and similar elongated vegetables in their lengthwise direction.

The main object of the invention is to provide a machine by which the lengthwise slicing operation performed upon elongated objects, such as stringless beans and the like, can be carried out substantially automatically, and at high speed.

Another object of the invention is to provide a machine of the character described, on which the objects may be dumped without prearranging them parallel to each other, and which will automatically arrange the objects so as to present them lengthwise to a series of knives mounted to cut the objects into strips of substantially uniform widths.

Other objects of the invention will become apparent as the detailed description thereof proceeds.

In the drawings:

Figure 1 is a side elevation of the bean slicing machine;

Figure 2 is a broken top plan view of the machine shown in Figure 1, with some parts omitted and others shown in section;

Figure 3 is a vertical transverse section taken on the line 3—3 of Figure 1;

Figure 4 is a vertical section, to an enlarged scale, taken on the line 4—4 of Figure 2; and Figure 5 is a fragmentary transverse section, to an enlarged scale, taken on the line 5—5 of Figure 2.

As shown in the drawings, the invention comprises supporting framework, including pairs of standards S spaced apart lengthwise of the machine and connected at their upper ends to channel iron runners 1 and 2. The rear ends of the runners 1 and 2 are connected by a transverse bar 3 of angle iron; while the other parts of the runners 1 and 2 are held in properly spaced apart relation by means of the cross braces 4, 5, and 6 which are of inverted U-shape and have their opposite ends suitably secured to the said runners.

In the supporting framework, an endless conveyor belt 7 is mounted upon the rollers 8 and 9 mounted on shafts 8' and 9' journaled in bearings 10 and 11, respectively, suitably supported upon lengthwise struts 12 and 13 forming fixed parts of the framework. In Figure 1 of the drawings, there is shown only one bearing for each roller shaft of the endless belt conveyor. It will be understood, however, that the supporting struts 12 and 13 and the bearings 10 and 11 will be duplicated on the opposite side of the supporting framework.

The upper branch 14 of the endless belt 7 is supported throughout its length by means of a series of spaced apart plates 15, 16, and 17, which extend parallel to each other and lengthwise under the branch 14, and which, in turn, are suitably supported by transverse braces 18 having their opposite ends seated on the lower flanges 19 and 20 of the channel irons which form the runners 1 and 2.

The cross braces 4, 5, and 6 have secured to their lower faces series of plates 21 which are parallel to each other and have their lower edges in sliding contact with the face of the branch 14 of the conveyor belt. These plates 21 are in the nature of parallel partitions which form, with the upper face of the conveyor belt, guide grooves or channels for feeding the objects to the knives. The width of the grooves or channels formed by the spaced apart plates 21 must obviously be less than the lengths of the objects, in order to prevent the objects from extending lengthwise across the channels.

Near the discharge end of the machine there is mounted a frame designated generally by the reference numeral 22 having a top 23 which supports a motor 24 for operating the slicing mechanism to be described hereinafter. The rotor shaft 25 of the motor 24 has a pair of sprockets 26 and 27 keyed or otherwise suitably secured thereto. The sprocket 27 is connected by a sprocket chain 28 to a sprocket 29, fixed to a shaft 30 extending across the machine at the discharge end thereof and journaled in suitable bearings 31 and 32 supported by the runners 1 and 2.

The sprocket 26 is connected by a chain 33 to a large sprocket 34 fixed to a shaft 35 journaled in suitable bearings on the struts 12. A sprocket 36, secured to the shaft 35, is connected by a chain 37 to a sprocket 38 which is fixed to a shaft 39, which is journaled in suitable bearings 40 and 41 secured to the runners 1 and 2 of the framework. The shaft 30 has a series of circular knives 42 fixed thereto and spaced apart so as to extend in groups alined with the parallel channels formed by the partition plates 21.

As shown in Figure 4, the ends of these partition plates 21 extend quite close to the periphery of the knives and are curved to conform to the curvature thereof. Directly in front of the knives 42 there is mounted on the shaft 39, a series of drums or flattening discs 43. As shown in Figure 2 of the drawings, these discs are about equal in width to the width of the channels formed by adjacent plates 21. The drums 43 extend down into the channels close enough to the upper face of the endless belt conveyor to flatten out and force the stringless beans, or the like, into contact with the conveyor belt, and thereby prevent them from accumulating or piling up against the periphery of the knives.

To ensure a proper frictional contact of the stringless beans with the conveyor belt, there is arranged in suitable supporting framework on the upper part of the machine, a pipe 44 extending transversely over the partitions 21 and close to the flattening discs or drums 43. The spray pipe 44 is connected by suitable piping, through a valve 45, to a pipe 46, which in turn is connected to a suitable source of water supply. It has been found in actual use that a water spray arranged close to the drums 43 substantially as shown in the drawings, has the effect of causing the stringless beans to adhere to the upper face of the belt conveyor as a preliminary to be flattened by the drums 43 on their way to be cut by the knives 42.

A cross bar 47 is supported at its opposite end in brackets 48 and 49 secured to the runners 1 and 2, respectively. Extending from the cross bar 47 is a comb or series of stripper rods 50, having their free ends extending between the side faces of adjacent knives for the purpose of stripping from these saws any material which might adhere to them during their cutting operation.

In operation, the beans or similar objects are dumped onto the downwardly inclined feed hopper H at the inlet end of the machine. The beans move by gravity onto the conveyor belt between the partition plates 21. The drag of the conveyor belt and the friction of the beans against sides of said plates causes the beans to extend lengthwise in the feed channels formed by said plates.

As the beans arrive lengthwise near the drums 43, they and the conveyor belt are sprayed with water from the spray pipe 44. This wetting causes the beans to adhere somewhat loosely to the belt. The wet beans then pass under the drums 43 and are flattened thereby just before they contact with the knives 50, which have their cutting edges seated in parallel grooves 50' formed in the belt 7. The water from the spray also moistens the grooved surface of the belt so that the knives move easily in the grooves without possibility of injury to either belt or knives.

The extension of the parallel plates beyond the drums 43 to the periphery of the knives 42 is necessary to ensure delivery of the objects to be cut in proper relation to the knives.

It is to be understood that the invention is not to be considered as limited to the specific construction and arrangement described herein, since it is evident that many changes may be made without departing from the scope of the invention as defined by the claims appended hereto.

What I claim is:

In a machine for slicing stringless beans or the like, a substantially horizontal support, a conveyor belt traveling lengthwise of said support and having a series of parallel grooves in one face thereof, a feed hopper mounted over said conveyor at one end of said support, a series of circular knives rotatably mounted at the other end of said support with their peripheries seated in said grooves, a series of guide plates mounted on said support parallel to each other and extending from said hopper to said knives, and with their lower edges in relatively sliding contact with the grooved face of said belt, means for rotating said knives and driving said conveyor belt, a shaft mounted to rotate on said support adjacent to said knives smooth-surfaced drums on said shaft extending into the channels formed by said guide plates and substantially equal in widths to the widths of said channel to press the beans or the like into frictional contact with said conveyor belt, and mechanism, in advance of and adjacent to the last named means for directing a spray of liquid onto the conveyor belt and beans or the like thereon during the movement thereof toward said knives.

RUFUS A. MILLS.